United States Patent [19]

Bundy

[11] Patent Number: 5,139,296

[45] Date of Patent: Aug. 18, 1992

[54] STAINLESS STEEL TRUCK BUMPER

[76] Inventor: Don Bundy, P.O. Box 1839, Sapulpa, Okla. 74067

[21] Appl. No.: 843,146

[22] Filed: Feb. 28, 1992

[51] Int. Cl.$^5$ .................................. B60R 19/48
[52] U.S. Cl. .................................... 293/117
[58] Field of Search ............... 293/102, 117, 116, 120, 293/121, 123, 155

[56] References Cited

U.S. PATENT DOCUMENTS

| | | | |
|---|---|---|---|
| 2,492,914 | 12/1949 | Barden | 293/117 X |
| 3,237,964 | 3/1966 | Doyle | 293/120 X |
| 3,774,952 | 11/1973 | Zorn | 293/117 |
| 4,950,009 | 8/1990 | Vetter | 293/117 |

*Primary Examiner*—Margaret A. Focarino
*Assistant Examiner*—Joseph D. Pape
*Attorney, Agent, or Firm*—William S. Dorman; Molly D. McKay

[57] ABSTRACT

The invention is a vehicle bumper constructed by attaching a horizontal top plate and an essentially horizontal base plate both made of mild steel or other similar material to the top and bottom, respectively, of a vertical stainless steel plate which has been formed into the shape of a bumper. The top plate and where the top plate is attached to the stainless steel plate are covered by a plastic cap which secures to the top plate. The bottom plate and where the bottom plate is attached to the stainless steel plate are covered by a plastic base plate cover which secures to both the bottom plate and the stainless steel plate. The stainless steel plate is provided with holes for securing a license plate and license plate lights thereto. The bottom plate is provided with holes for securing hitches to the bumper and holes for securing the bumper to the vehicle.

17 Claims, 2 Drawing Sheets

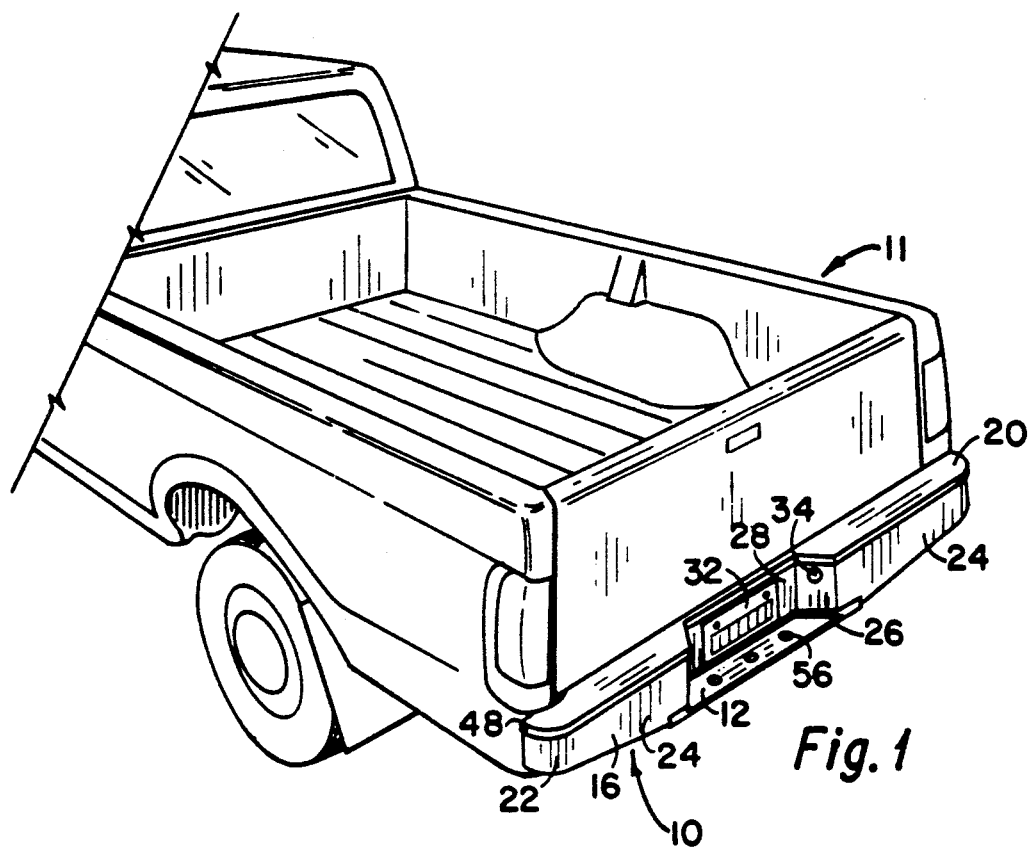
Fig. 1
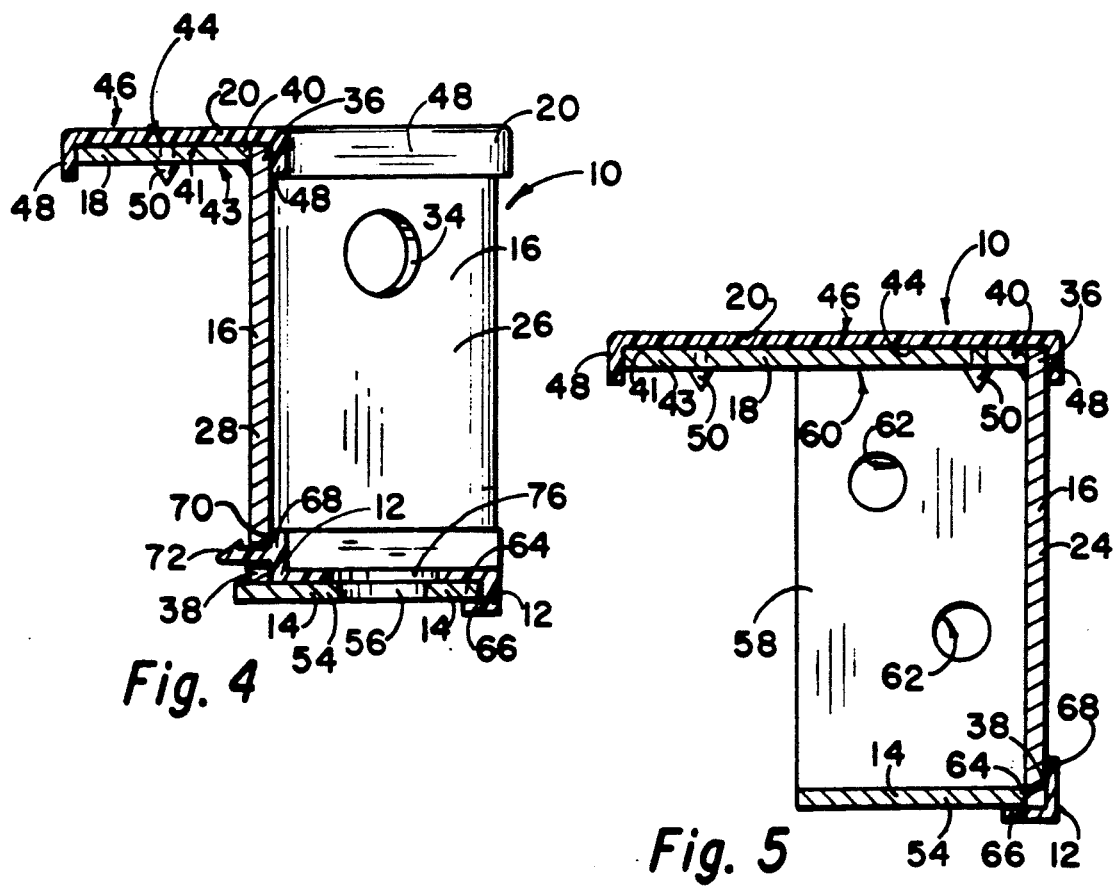
Fig. 4
Fig. 5

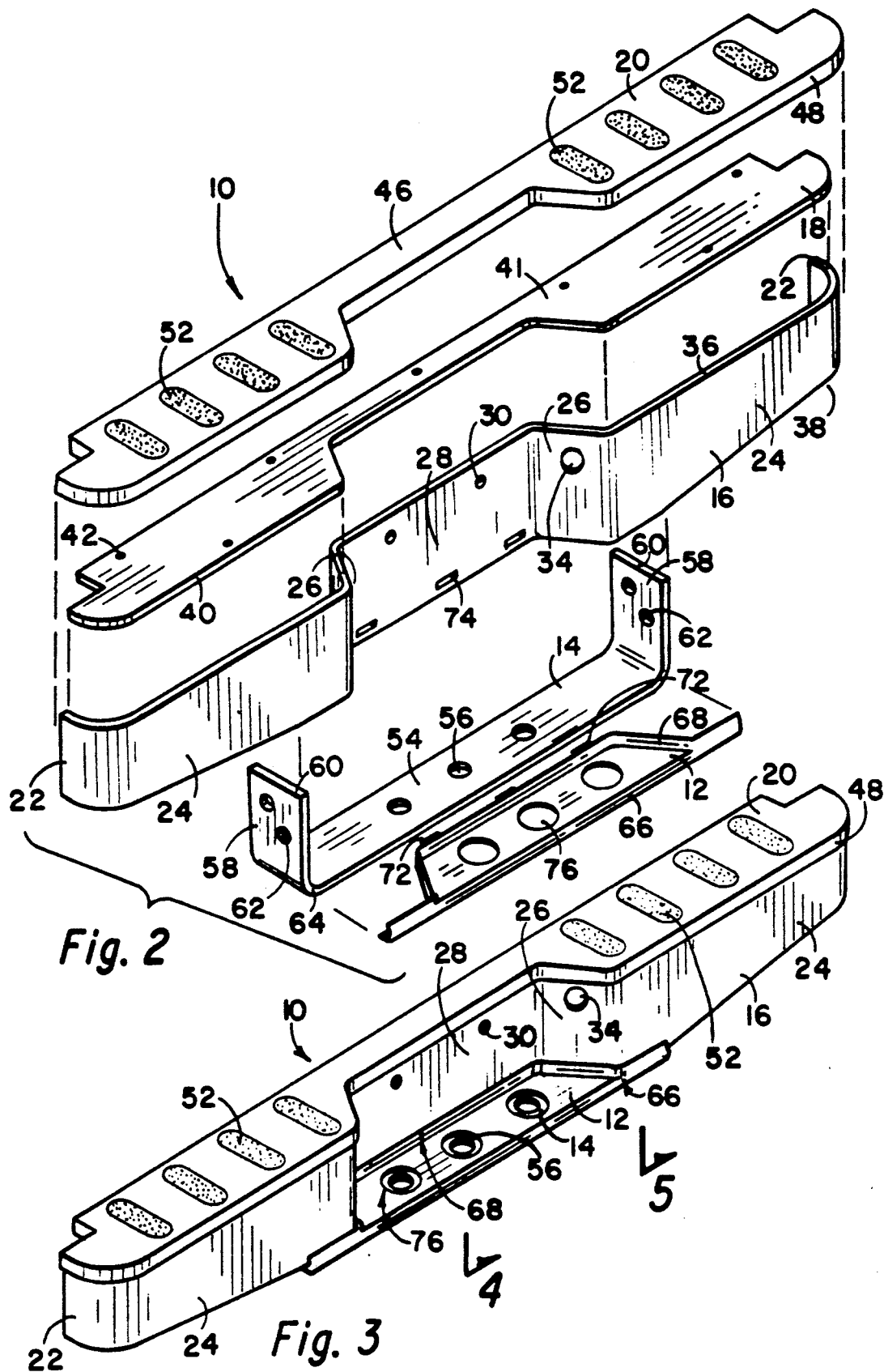

STAINLESS STEEL TRUCK BUMPER

BACKGROUND OF THE INVENTION

1. Field of the Invention

The present invention relates to a bumper for use on a pickup truck or other similar vehicle comprised of a stainless steel portion. More specifically, the present invention relates to a stainless steel bumper and a method of making a stainless steel bumper by attaching two essentially horizontal mild steel components to upper and lower edges respectively of a vertical stainless steel component, and by using a plastic cap and a plastic base plate cover to conceal the mild steel components and the upper and lower edges of the vertical stainless steel component.

2. The Prior Art

Frequently, pickup trucks are sold without rear bumpers or rear bumpers are installed during the useful life of the vehicle as a customized feature or as a replacement for a damaged bumper. Bumpers having a shiny appearance are particularly popular with consumers. Frequently, such bumpers have been chrome-plated. However, environmentally conscious consumers do not like the environmental implications associated with chrome-plating operations, and for this reason, prefer bumpers constructed of stainless steel. Also, bumpers constructed of stainless steel do not chip when dented as do chrome-plated bumpers.

Although it has been possible to employ stainless steel in the construction of bumpers, the difficulties in forming and polishing such bumpers have made them substantially more expensive than chrome-plated bumpers.

The present invention allows a stainless steel bumper to be manufactured at lower cost than one-piece stainless steel bumpers and at lower cost than chrome-plated bumpers.

SUMMARY OF THE INVENTION

The invention is a vehicle bumper constructed by attaching a horizontal top plate and an essentially horizontal base plate to an upper edge and a lower edge, respectively, of a vertical stainless steel plate which has been formed into the shape of a bumper.

The top plate and the upper edge of the stainless steel plate are covered by a plastic cap and a downward-oriented perimeter lip provided on the cap. The cap is provided with bayonet-type tabs on its bottom side which insert through cap securing holes provided in the top plate, securing the cap to the top plate. The cap is provided with step grips on its top side to insure secure footing when stepping onto the bumper.

The stainless steel plate is provided with holes for securing a license plate thereto and holes for mounting license plate lights thereto.

The bottom plate has two ends which are bent at right angles to its central horizontal portion, forming vertical support faces at the two ends. The bottom plate's two ends are attached to a bottom side of the top plate. The vertical support faces are provided with bracket holes by which the bumper can be secured by brackets to a vehicle. The central horizontal portion is provided with ball holes in which ball hitches can be mounted.

The bottom plate and the lower edge of the stainless steel plate are covered by a plastic base plate cover having an upward-oriented back lip and a downward-oriented front lip. The base plate cover is secured to the bumper by the downward-oriented front lip which engages a front edge of the base plate and by bayonet-type hooks located on a back side of the upward-oriented back lip which insert through cover securing notches provided in the stainless steel plate. The base plate cover is provided with openings which provide access to the ball holes in the base plate.

BRIEF DESCRIPTION OF THE DRAWINGS

FIG. 1 is a perspective view of a bumper constructed in accordance with a preferred embodiment of the present invention shown installed on a vehicle.

FIG. 2 is an exploded view of a bumper constructed in accordance with a preferred embodiment of the present invention.

FIG. 3 is a perspective view of a bumper constructed in accordance with a preferred embodiment of the present invention.

FIG. 4 is a cross-sectional view of a bumper taken along line 4—4 of FIG. 3.

FIG. 5 is a cross-sectional view of a bumper taken along line 5—5 of FIG. 3.

DETAILED DESCRIPTION OF THE PREFERRED EMBODIMENTS

Referring to the drawings and initially to FIG. 1, there is illustrated a stainless steel bumper 10 constructed in accordance with the principles of the present invention. The bumper 10 is attached to a vehicle 11, normally a pickup truck.

As illustrated in FIG. 2, the bumper 10 is constructed from five parts: a base plate cover 12, a horizontal base plate 14, a vertical stainless steel plate 16, a horizontal top plate 18, and a horizontal cap 20 Both the base plate 14 and the top plate 18 are made of mild steel or other suitable material capable of being attached to the stainless steel plate 16 by welding or other appropriate means of attachment. The base plate cover 12 and the cap 20 are made of plastic or other suitable material.

The stainless steel plate 16 is bent into an appropriate contour to form a vertical portion of the bumper 10. In the illustrated embodiment, for example, the stainless steel plate 16 comprises two side wing surfaces 22 located one at each of the two ends of the bumper 10 and curved toward the vehicle 11, two co-planer back surfaces 24 located adjacent to and medially from the two side wing surfaces 22, two angled surfaces 26 located adjacent to and medially from the two back surfaces 24, and a central plate surface 28 located between the two angled surfaces 26. The angled surfaces 26 and the plate surface 28 form a central recessed portion of the bumper 10, providing a place for attachment of a license plate 32. The form of the stainless steel plate 16 is illustrative only, and other shapes are possible without departing from the spirit or intent of the invention.

Plates of stainless steel resist deformation and three-dimensional forming of plates of stainless steel, while possible, is difficult and entails considerable cost. The formation of the stainless steel plate 16 requires bends which are substantially 2 degrees of freedom, that is, the bends could be formed by bending the material around a cylinder. The more complex and costly form, utilizing 3 degrees of freedom, such as forms which would require bending the material around a sphere, are not employed.

The plate surface 28 is provided with license plate mounting holes 30 for mounting the license plate 32 to the bumper 10. The two angled surfaces 26 are provided with license plate light holes 34 into which license plate lights (not shown) can be mounted.

The vertical stainless steel plate 16 is provided with an upper edge 36 and a lower edge 38. The top plate 18 is shaped to fit contours in the upper edge 36 of the stainless steel plate 16 and is attached along its front edge 40 to the upper edge 36 of the stainless steel plate 16, thus giving depth to the bumper 10. The top plate 18 is provided with a top side 41, a bottom side 43 and cap securing holes 42 extending from the top side 41 through to the bottom side 43 for attaching the cap 20 to the top plate 18.

The cap 20 has a bottom side 44, a top side 46, and a downward-turned perimeter lip 48 extending around the entire cap 20. The bottom side 44 is provided with bayonet-type tabs 50 which insert into the holes 42, securing the cap 20 to the top side 41 of the top plate 18. When the cap 20 is secured to the top plate 18, the perimeter lip 48 of the cap 20 will extend downward to completely cover the upper edge 36 of the stainless steel plate 16 and all sides of the top plate 18 except the bottom side 43, thus concealing where the top plate 18 and the stainless steel plate 16 are attached together.

As an added safety feature, the top side 46 of the cap 20 can be provided with step grips 52 to insure a firm footing when stepping onto the bumper 10.

The base plate 14 is formed from a piece of metal having parallel sides. Said base plate 14 has a central horizontal portion 54 provided with ball holes 56 into which ball hitches (not shown) can be installed. The base plate 14 has vertical support faces 58 at each of two ends 60 which form right angles with the central horizontal portion 54. Each support face 58 is provided with bracket holes 62 into which vehicle brackets (not shown) attach as a means of securing the bumper 10 to the vehicle 11.

The base plate 14 has a front edge 64 attached to the lower edge 30 of the stainless steel plate 16 along part of the back surfaces 24. The lower edge 38 of the stainless steel plate 16 is also attached to the base plate 14 along the angled surfaces 26 and the plate surface 28. The ends 60 on the vertical support faces 58 are attached to the bottom side 43 of the top plate 18.

The base plate cover 12 is shaped to fit over part of the horizontal portion 54 of the base plate 14 and contoured to fit against the plate surface 28, the angled surfaces 26, and a small part of the back surfaces 24 of the stainless steel plate 16 The base plate 14 is provided with a front downward-oriented lip 66 which engages the front edge 64 of the base plate 14 and an upward-oriented back lip 68. Said upward-oriented back lip 68 has a back side 70 provided with bayonet-type hooks 72 which insert into cover-securing notches 74 provided in the plate surface 28 of the stainless steel plate 16, thus securing the base plate cover 12 to the bumper 10. The lips 68 and 70 of the base plate cover 12 function to conceal where the base plate 14 is attached to the stainless steel plate 16 along the plate surface 28, the angled surfaces 26, and part of the back surface 24. The base plate cover 12 is provided with openings 76 which allow access to the ball holes 56 in the base plate 14.

The base plate cover 12 can be modified to include sliding plates (not shown) designed to cover the openings 76 and the ball holes 56 whenever a ball hitch (not shown) is not being employed therein.

Whereas, the present invention has been described in particular relation to the drawings attached hereto, it should be understood that other and further modifications, apart from those shown or suggested herein, may be made within the spirit and scope of this invention.

What is claimed is:

1. A bumper for a vehicle comprising a vertical stainless steel plate formed into the shape of a bumper and having a central recessed portion, means for attaching the bumper to the vehicle, a horizontal top plate attached to an upper edge of the stainless steel plate and contoured to the shape of the stainless steel plate, a cap attached to the top plate and covering the top plate and the upper edge of the stainless steel plate, a base plate having a central horizontal portion which attaches to a lower edge of the stainless steel plate in the central recessed portion of the stainless steel plate, said central horizontal portion extending across said central recessed portion and being provided with ball holes for attaching ball hitches, a base plate cover attaching to the base plate and covering part of the central horizontal portion of the base plate and the lower edge of the stainless steel plate, said base plate cover provided with openings which permit access to the ball holes in the base plate.

2. A bumper according to claim 1 wherein the openings in the base plate cover coincide with the ball holes in the central horizontal portion of the base plate cover.

3. A bumper according to claim 1 further comprising step grips provided in the cap in order to insure a secure footing when stepping onto the bumper.

4. A bumper according to claim 1 further comprising means for attaching a license plate to the stainless steel plate.

5. A bumper according to claim 4 further comprising means for attaching a license plate light to the stainless steel plate.

6. A bumper according to claim 1 further comprising an upward-oriented back lip and a downward-oriented front lip being provided on the base plate cover, said base plate cover in conjunction with its upward-oriented back lip and downward-oriented front lip covering part of the central horizontal portion of the base plate and the lower edge of the stainless steel plate.

7. A bumper according to claim 6 further comprising bayonet-type hooks provided in a back side of the upward-oriented back lip, the downward-oriented front lip engaging a front edge of the base plate, the stainless steel plate being provided with cover-securing notches into which the bayonet-type hooks insert as a means of attaching the base plate cover to the base plate.

8. A bumper according to claim further comprising a downward-turned perimeter lip provided on the cap, said cap and perimeter lip contoured to the shape of the top plate and covering the top plate and the upper edge of the stainless steel plate.

9. A bumper according to claim 1 wherein welding is the means of attaching the top plate, the base plate, and the stainless steel plate.

10. A bumper according to claim 1 wherein the base plate is provided with two ends which are bent at right angles to the horizontal portion, thus forming vertical support faces.

11. A bumper according to claim 10 wherein the ends of the base plate attach to a bottom side of the top plate.

12. A bumper according to claim 11 wherein the bumper is attached to the vehicle by means of bracket holes provided in the vertical support faces.

13. A method for making a stainless steel bumper for use on a vehicle comprising the following steps: forming a stainless steel plate into a vertical bumper shape having a central recessed portion, attaching a front edge of a horizontal top plate to an upper edge of the stainless steel plate, attaching a cap to a top side of the top plate so the cap covers both the top plate and the upper edge of the stainless steel plate, forming a base plate into a central horizontal portion with ends which are bent to form vertical support faces with means on the vertical support faces to secure the base plate to the vehicle, attaching the bottom plate to a lower edge of the stainless steel plate in the central recessed portion of the stainless steel plate, attaching a bottom plate cover to the bottom plate so the bottom plate cover extends over both a portion of the bottom plate and the lower edge of the stainless steel plate.

14. A method for making a stainless steel bumper according to claim 13 further comprising the following steps: punching holes in the stainless steel bumper for attaching a license plate and a license plate light.

15. A method for making a stainless steel bumper according to claim 13 further comprising the following steps: punching ball holes in the bottom plate for attaching ball hitches thereto, forming openings in the bottom plate cover to provide access to the ball holes.

16. A method for making a stainless steel bumper according to claim 13 further comprising the following steps: attaching the ends of the base plate to a bottom side of the top plate.

17. A method for making a stainless steel bumper according to claim 16 wherein welding is the means of attaching the top plate, the base plate and the stainless steel plate.

* * * * *